(No Model.)
L. A. HANNIGAN.
DUST PAN.
No. 586,358. Patented July 13, 1897.
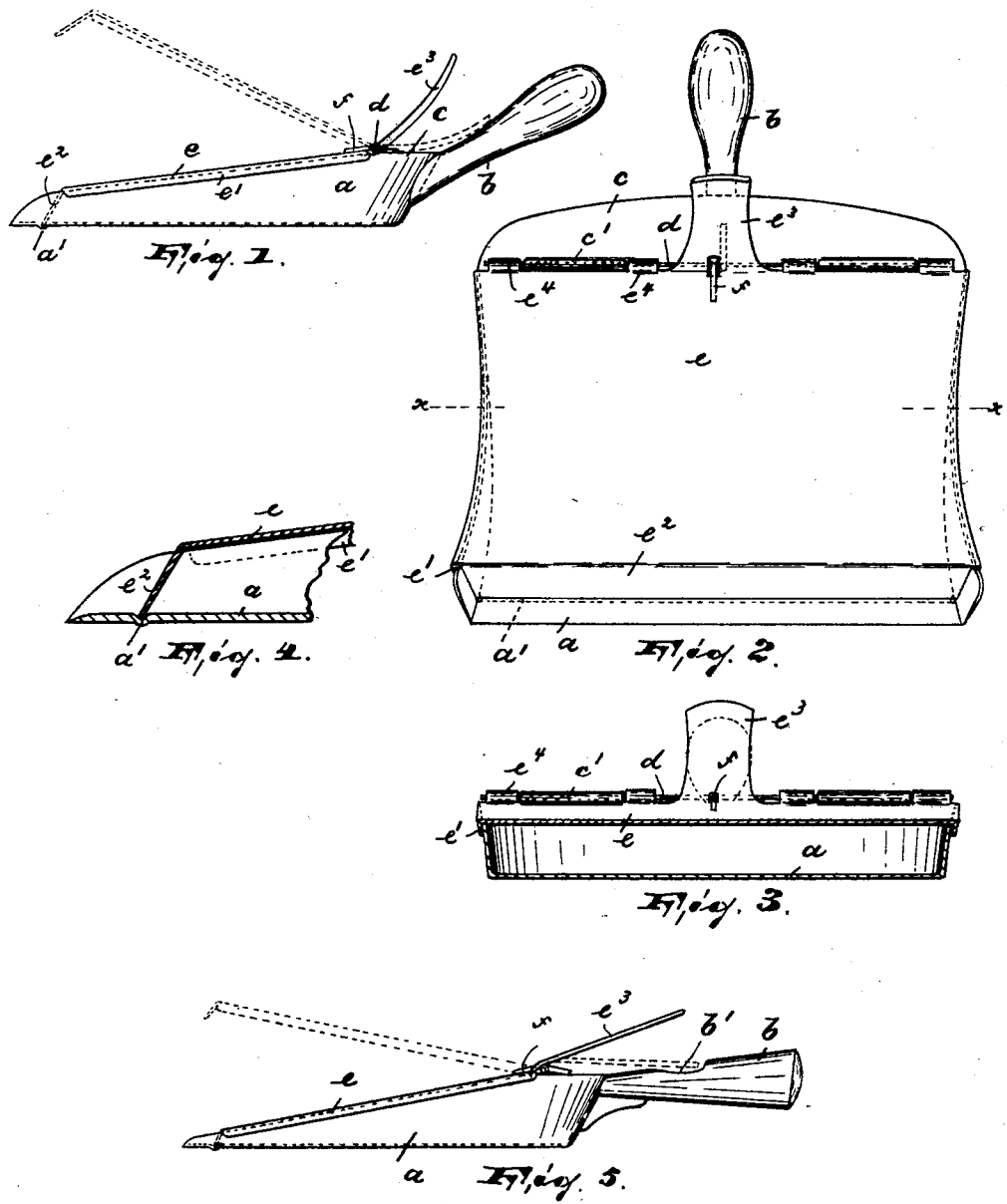
WITNESSES:
Wm. D. Bell.
L. Snyder.
INVENTOR:
Lucy Ann Hannigan
BY Gartner &co — ATTY'S

UNITED STATES PATENT OFFICE.

LUCY ANN HANNIGAN, OF PATERSON, NEW JERSEY.

DUST-PAN.

SPECIFICATION forming part of Letters Patent No. 586,358, dated July 13, 1897.

Application filed April 6, 1897. Serial No. 630,971. (No model.)

*To all whom it may concern:*

Be it known that I, LUCY ANN HANNIGAN, a citizen of the United States, residing in Paterson, county of Passaic, and State of New Jersey, have invented certain new and useful Improvements in Dust-Pans; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to dust-pans provided with hinged covers; and its object is to provide a dust-pan of the character above stated of simple, strong, and durable construction, easily handled, and reliable and efficient in operation.

The invention consists in the improved dust-pan, in its spring-controlled flanged lid or cover, and in the combination and arrangement of the various parts thereof, substantially as will be hereinafter more fully described, and finally embodied in the clauses of the claim.

Referring to the accompanying drawings, in which like letters of reference indicate corresponding parts in each of the several views, Figure 1 is a side elevation of an ordinary dust-pan provided with my improvements; Fig. 2, a top plan view of Fig. 1; Fig. 3, a sectional view on the line $x\,x$ of Fig. 2; Fig. 4, an enlarged detail sectional view of the front portion of the pan and its cover, and Fig. 5 a side elevation illustrating a slight modification of my improvements.

In said drawings, $a$ represents a pan provided with a cross-piece or bridge $c$ and with a handle $b$, all of the usual and well-known construction. On the forward edge of the cross-piece or bridge $c$ and preferably integral therewith are arranged a series of knuckles $c'$, supporting the pin or axle $d$, on which is loosely mounted the lid or cover $e$ by means of the knuckles $e^4$, preferably made integral with said lid or cover. The latter is provided at its sides with downwardly-extending flanges $e'$, adapted to engage the sides of the pan $a$, while the front portion of said lid or cover is bent downward, as at $e^2$, and is adapted to engage with its lower edge a groove or depression $a'$, arranged in the bottom of the pan $a$, as clearly shown in the drawings.

The rear central portion of the lid or cover $e$ terminates in a handle or thumb-piece $e^3$, adapted to be engaged and depressed by a finger of the hand holding the handle $b$, when the lid is to be opened.

A coil-spring is arranged on the pin or axle $d$ and substantially in the center of the same, and bears with one end on the top of the lid or cover $e$ and with its other end against the under side of the cross-bar or bridge $c$ and serves to hold said lid or cover in normal closed position.

In Fig. 5 the handle $b$ is provided with a depression $b'$, thus allowing the thumb-piece $e^3$ to enter and engage the said depression, whereby the lid or cover $e$ can be more conveniently held in its opened position, as will be manifest.

From the foregoing it can be seen that the lid or cover with its side flanges $e'$ engages the sides of the pan $a$ and with its downwardly-projecting front piece $e^2$ the groove or depression $a'$ in the bottom of said pan, thereby rendering said pan dust-proof.

Having thus described my invention, what I claim as new, and desire to secure by Letters Patent, is—

1. A dust-pan consisting of a body, provided at its rear portion with a cross-piece and handle, and in its front portion with a groove or depression, a lid or cover hinged with its rear portion to the said cross-piece, and having its front portion bent downward and adapted to engage with its lower edge the said groove or depression, a downwardly-extending flange on each side of the lid or cover and adapted to engage the sides of the said pan, a thumb-piece projecting from the rear portion of said lid or cover and centrally arranged thereon, and a spring controlling said lid or cover substantially as specified.

2. A dust-pan consisting of a body, provided at its rear portion with a cross-piece or bridge and with a handle, and in its front portion with a transverse groove or depression, a pin or axle suitably supported on said cross-piece and parallel with said groove or depression, a lid or cover fulcrumed on said pin or axle and having its front portion bent downward and adapted to engage with its lower edge said groove or depression, a downwardly-extending flange on each side of the lid or cover and adapted to engage the sides of the pan, a thumb-piece rearwardly projecting from the lid or cover and centrally arranged thereon, and a coil-spring on said pin or axle and bearing with one end on the top of the lid or cover, and with its other end on the under side of said cross-piece or bridge, substantially as and for the purposes described.

In testimony that I claim the foregoing I have hereunto set my hand this 27th day of March, 1897.

LUCY ANN HANNIGAN.

Witnesses:
ALFRED GARTNER,
WM. D. BELL.